W. G. WAGENHALS.
CHASSIS.
APPLICATION FILED MAY 19, 1911.
1,030,357.
Patented June 25, 1912.
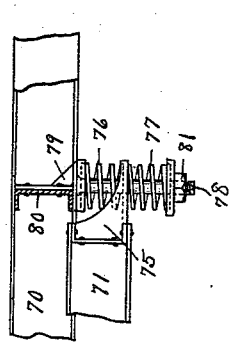
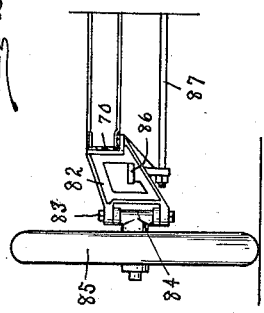
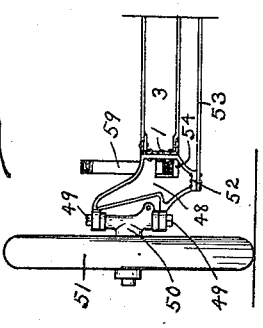
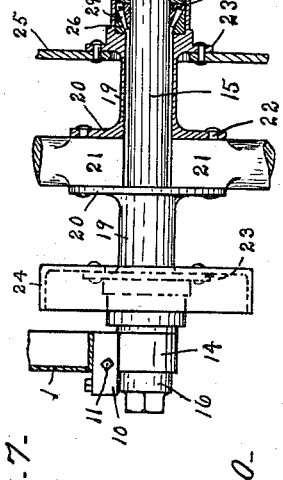
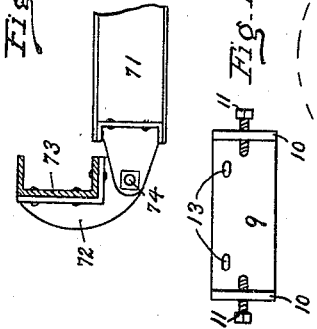
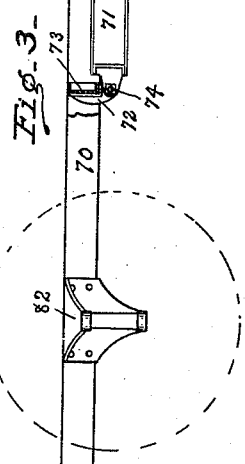
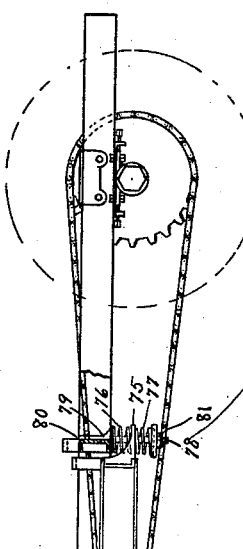

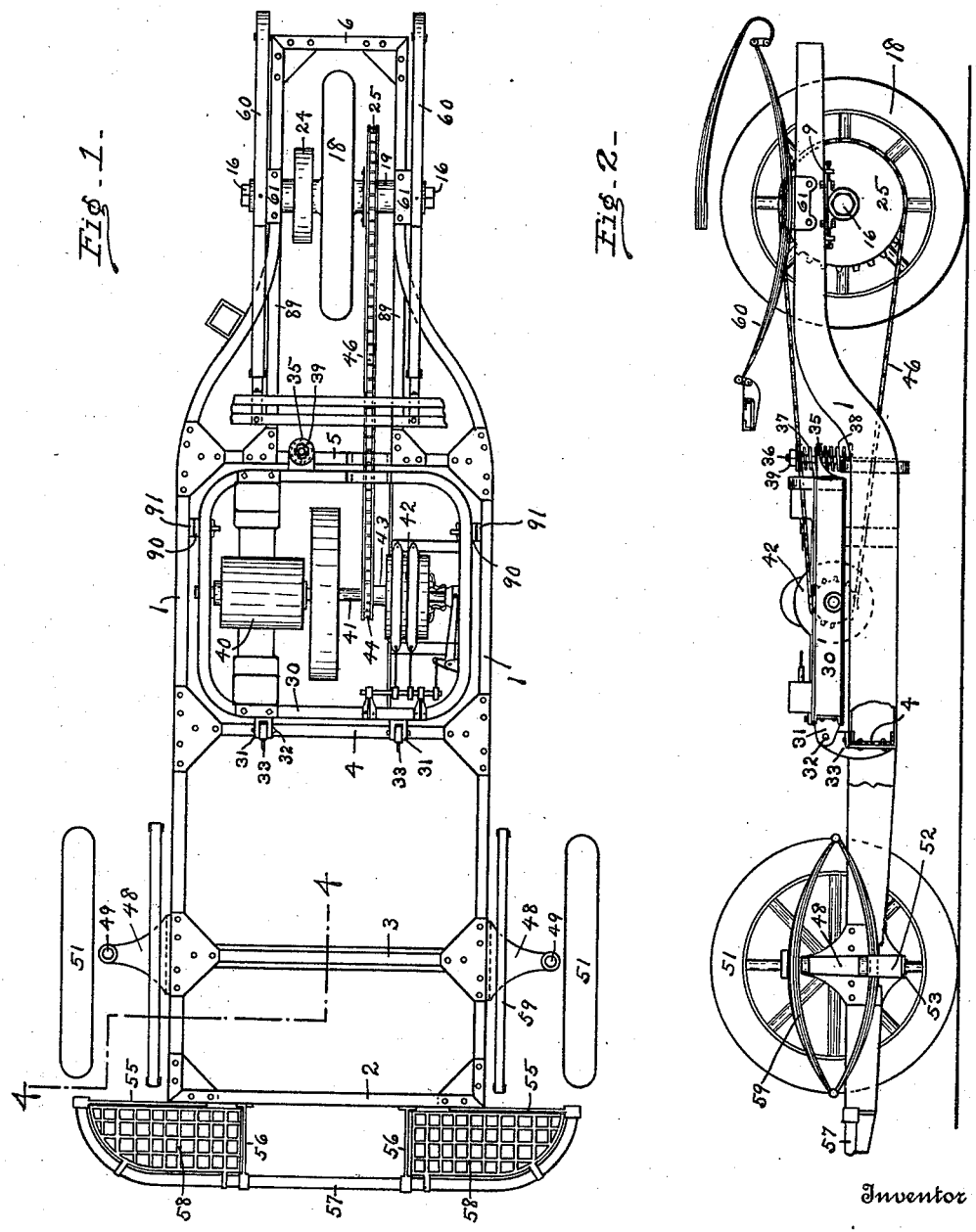

UNITED STATES PATENT OFFICE.

WILLIAM G. WAGENHALS, OF DETROIT, MICHIGAN.

CHASSIS.

1,030,357.  Specification of Letters Patent.  Patented June 25, 1912.

Application filed May 19, 1911. Serial No. 628,259.

*To all whom it may concern:*

Be it known that I, WILLIAM G. WAGENHALS, a citizen of the United States, and a resident of Detroit, in the county of Wayne and State of Michigan, have invented a new and useful Chassis, of which the following is a specification.

This invention relates to the main frame of an automobile and the parts immediately connected thereto, and its object is to provide a strong, simply constructed chassis especially adapted for automobiles having two front wheels and one rear wheel, which is the driving wheel of the vehicle, and which shall have a proper carrying device for the motor.

This invention consists of a main frame of novel design in combination with a novel supporting frame for the motor, novel brackets for the knuckles of the axles of the front wheels, and novel supporting means for the rear wheel.

In the accompanying drawings, Figure 1 is a plan of the chassis of a passenger automobile with engine, transmission and wheels in position. Fig. 2 is a side elevation of the same. Fig. 3 is a similar view of a modified form of chassis adapted for commercial vehicles. Fig. 4 is an elevation on the line 4—4 of Fig. 1. Fig. 5 is a similar elevation of the same parts of the chassis shown in Fig. 3. Fig. 6 is a detail of the resilient suspension of the engine frame of the chassis shown in Fig. 3. Fig. 7 is a detail of the suspension device at the opposite end of the same. Fig. 8 is a detail of the rear axle of both forms of construction. Fig. 9 is an elevation of the adjustable bearing of the same. Fig. 10 is a bottom plan of a saddle plate.

Similar reference characters refer to like parts throughout the several views.

The characteristic features of this construction are a rigid main frame, a single rear driving wheel directly supporting the rear end of the frame, front wheels connecting directly to the frame, the omission of the usual springs between the wheels and frame, the omission of a front axle, and the auxiliary engine frame hinged directly to the frame at one end and resiliently supported thereby at the other.

The main frame is formed from two rolled or pressed beams 1, preferably channel beams; their front portions extending parallel to each other and connected by cross bars 2, 3, 4 and 5, all preferably channel beams, the joints between the beams and bars being properly reinforced by gusset plates. The rear ends of the beams 1 are also parallel and connected by an end bar 6. Between these parallel portions the beams 1 are curved as shown in the drawings.

Secured to the lower flanges of the beams 1 are saddle plates 9 having flanges 10 which are threaded for the set screws 11. Bolts 12 are slidable in slots 13 in these plates and carry the brackets 14 which in turn support the rear axle 15. Nuts 17 are screwed onto the threaded ends of the axle to position the same and caps 16 may be screwed over the nuts. On this rear axle are revoluble the sleeves 19, each having an inner flange 20. Between these flanges the inner ends of the spokes 21 of the rear wheel 18 are gripped by means of the bolts 22. On the sleeves are other flanges 23, to one of which is secured the brake drum 24, and to the other, the driving gear 25. Any desirable bearings may be employed, roller bearings being shown. The outer ends of the sleeves 19 carry tapering collars 26 of hard steel. Cones 27, also of hard steel are mounted on the axle 15, being positioned by collars 28. Tapering rollers 29 between the collars and cones complete the roller bearings. The sleeves 19 form the hub of the driving wheel.

Between the cross bars 4 and 5 is hung an auxiliary frame 30. One end of the frame (the front end in the drawings) is provided with hinge members 31, pivoted on the pins 32 carried by the brackets 33 which are secured to the cross bar 4. The other end of the frame is resiliently mounted in any desired manner. The means shown consist of a bracket 35 connected to the auxiliary frame, a bolt 36 mounted on the bar 5 and extending upward through a hole in the bracket 35, springs 37 and 38 on the bolt on either side of the bracket, and a nut 39 to put an initial tension on the springs.

Mounted in the auxiliary frame is any desired motor, that shown being a double-opposed engine 40, having a shaft 41. The drawing also shows conventionally the transmission gear 42, the sleeve 43, and the sprocket wheel 44, besides the usual control mechanism for the engine and transmission gears, the details of all of which form no portion of this invention. While any desired form of power transmitting mechanism may be employed between the engine and the rear driving wheel, a chain 46 passing around the sprocket wheels 44 and 25 are shown as a desirable form.

Secured to the beams 1, near their front ends are brackets 48 carrying pivots 49 for the knuckles 50. These knuckles carry the stub-axles for the wheels 51. These brackets have downwardly extending portions 52 which may be connected by the rods or bars 53. The tendency of the wheels is to swing in a vertical arc around the center of the beams 1 and to twist them, but these tension rods 53 serve to greatly stiffen the frame. By this construction the usual front axle is eliminated. The cross bar 3 is preferably located between these brackets.

Projecting from the front bar 12 are brackets 55 and 56 which carry the curved tube 57 and gratings 58. Side springs 59 are mounted on the front bracket 48 on saddles 54 and the rear springs 60 are connected to the side beams 1 by means of brackets 61. These springs support the body of the vehicle, which, when of the hansom type, may be entered by using the gratings 58 as steps.

The construction shown in Figs. 3, 5, 6 and 7 is adapted for commercial vehicles where there is less demand for a low-slung body. The side bars 70 can therefore be substantially horizontal, although the plan of the chassis and its connected parts will be substantially as shown in Fig. 1. The auxiliary frame 71 may be mounted below the main frame, as shown in Fig. 3, by securing the brackets 72 to a cross bar 73, which brackets carry pivots 74 on which the auxiliary frame is hinged. A bracket 75 on the rear end of the auxiliary frame extends between the springs 76 and 77; the bolt 78, carried by the bracket 79 on the cross bar 80, extending through a hole in this bracket 75 and through the springs. A nut 81 gives the desired initial tension to the springs.

Near the front end of the frame are brackets 82 which carry pivots 83 for the knuckles 84 of the front wheels 85. These brackets carry small saddles 86 to support springs and are braced by the tension rods 87.

Braces 89 (Fig. 1) may be inserted between the bar 5 and the brackets 14 to stiffen the frame where the heaviest stresses occur. The brackets 14 are adjustable by means of the screws 11 to keep the driving chain properly tightened.

By reason of the peculiar construction of the main frame and the manner of mounting the rear axle, the motor supporting frame, and the brackets for the knuckles of the front wheels, a construction of unusual rigidity is attained, which is necessary in the chassis of a three-wheeled vehicle, wherein unusual stresses often occur, which are not met in a four-wheeled construction. By mounting the motor on an auxiliary frame, excessive jarring and vibration are avoided. The power plant is entirely removable and replaceable, a most important point in public-service vehicles, such as hansom cabs invariably are.

By omitting the front axle, an item of considerable expense is avoided, and a rigid construction is attained because the brackets, which support the knuckles of the front wheels, may be made of great stiffness. By constructing the frame with the side beams extending forward as shown in the drawings, a rigid support for the combination front step and bumper is provided.

The details of construction and the proportions of the parts may be varied to suit the different requirements of traffic and the ideas of automobile builders without departing from the spirit of my invention.

Having now explained my improved chassis, what I claim as my invention and desire to secure by Letters Patent is:—

1. In an automobile chassis, the combination of a main frame comprising side bars and cross bars connecting the same, a motor-supporting frame mounted on the main frame intermediate its ends, the side bars of the main frame extending parallel to each other from their front ends to a transverse line at the rear of the motor frame, and then bending inwardly and extending rearwardly parallel to each other, and knuckles for the front wheels mounted on the side bars near their front ends.

2. In an automobile chassis, the combination of the main frame comprising cross bars, and side beams parallel to each other at their front ends and separated sufficiently to receive a motor-supporting frame, and also parallel to each other but a less distance apart at their rear ends, supports secured to the rear end of the frame, an axle carried by the supports, and a main driving wheel mounted on the axle between the side beams, that portion of the main frame at the rear of the motor-supporting frame being higher than the remainder of the main frame.

3. In an automobile chassis, the combination of the main frame comprising side beams parallel to each other at their ends and braces between them, adjustable supports mounted on the lower sides of said beams at their rear ends, a driving wheel carried by and between the supports, and brackets secured to said beams at the outer sides adapted to receive the knuckles of the front wheels of the automobile, said frame extending forward of the knuckles to form a support for a front step.

4. In an automobile chassis, the combination of a frame comprising side beams parallel to each other at their front ends and also parallel to each other but a less distance apart at their rear ends, braces for the side beams, outwardly extending brackets secured to said frame near its front end and provided with pivots adapted to receive the knuckles of the front wheels of the automobile, said brackets having downwardly extending projections, and a tie rod extending across beneath the frame and connecting to said projections.

5. In an automobile chassis, the combination of a frame comprising side beams and braces for the same, and outwardly extending brackets secured to said frame near its front end and provided with pivots adapted to receive the knuckles of the front wheels of the automobile, said brackets provided with apertures and seats to receive the front springs of the vehicle.

In testimony whereof I have signed this specification in the presence of two subscribing witnesses.

WILLIAM G. WAGENHALS.

Witnesses:
EDWARD N. PAGELSEN,
ELIZABETH M. BROWN.

---

Copies of this patent may be obtained for five cents each, by addressing the "Commissioner of Patents, Washington, D. C."